C. MOWRY.
Improvement in Machines for Sawing and Jointing Staves.
No. 131,022. Patented Sep. 3, 1872.
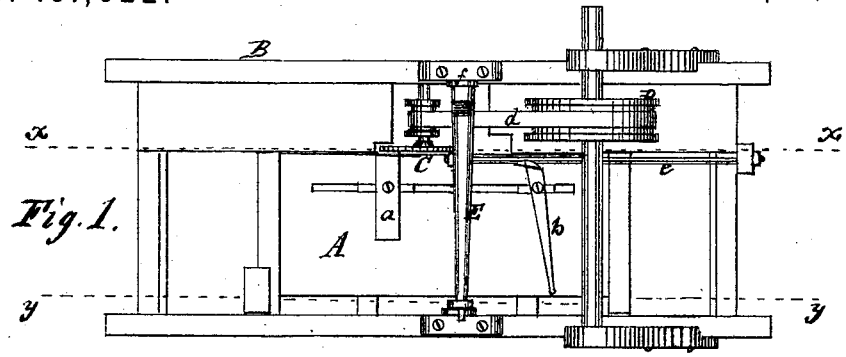
WITNESSES:
Hiram Preston
F. W. Morley
INVENTOR:
Charles Mowry

UNITED STATES PATENT OFFICE.

CHARLES MOWRY, OF ONEIDA LAKE, NEW YORK.

IMPROVEMENT IN MACHINES FOR SAWING AND JOINTING STAVES.

Specification forming part of Letters Patent No. 131,022, dated September 3, 1872.

Specification describing an Improvement in Machines for Sawing and Jointing Staves, invented by CHARLES MOWRY, of Oneida Lake, in the county of Madison and State of New York.

The timber used in this machine is prepared by sawing it into planks that are of a thickness to correspond to the width of the staves, and cut into stave lengths. The blocks so prepared are manufactured into staves by one operation in this machine, a circular saw cutting staves from the edge of the block while rotating cutters give them the proper bevel and bilge. The invention consists in combining, with a sawing-table, forming-cutters and certain novel devices for operating the same, so that the edge of the block is acted upon by the cutters in advance of the saw, and a finished stave cut from the block at each movement of the table, as hereinafter more fully described.

Figure 1 is a top view or plan. Fig. 2 is a vertical longitudinal section taken in the line $x$ $x$, Fig. 1. Fig. 3 is a vertical longitudinal section taken in the line $y$ $y$ in Fig. 1. Fig. 4 is a cross-section taken in the line $z$ $z$ in Fig. 2.

Similar letters of reference indicate like parts in the several figures.

In the accompanying drawing, A is the sliding table. B is the frame-work. C is the saw. For this machine the stuff is sawed into planks and then cut into suitable lengths for stave-bolts, and this machine saws from the edges of said bolts or pieces of plank, and shapes the pieces into staves at the same time they are cut from the bolt. The stave-bolt is secured on the table by a clamping-lever, $b$, Fig. 1, with a dog on the short end, said lever pressing the bolt against the rest $a$. The rest $a$ and clamping-lever $b$ are fastened to the table in such manner as to be readily adjusted on the table to accommodate bolts of various lengths.

As the table is pushed endwise to carry the bolt to the saw, the edge of said bolt is beveled and bilged sufficiently to form one stave by a pair of revolving cutters, $c$ $c$, that prepare the block in advance of the saw, so that when cut from the bolt the stave is completed as regards bevel and bilge. The proper movement for shaping the stave is given to the cutters $c$ $c$ by suspending said cutters in levers E E, Fig. 4, one end of which is secured rigidly to a spring-steel standard, $f$, and their other ends are moved to and from each other by swinging links $g$ $g$ and lever G, Fig. 3, with each movement of the table. The lever G is pivoted to the frame-work at $h$, Fig. 3, and is operated by the table by a connecting-arm, H, that projects from the lower side of the table. Each movement of the table causes the lever G to swing or vibrate, and by the links $g$ draw the levers E together at each end of a stave, thereby moving the revolving cutters $c$ $c$ toward each other to give the stave the proper bilge. It is obvious that other devices or movements than the links and lever G may be used for moving the cutter-levers to and from each other. I, however, consider the links and lever, as shown, the most simple means for swinging said levers. The throw of these parts is adjustable for any size of stave. The change that takes place in the angle of the levers gives the correct difference of bevel between the bilge and ends of the stave; but for changing from one size of staves to another, the cutters $c$ are set accordingly or adjusted on the shafts K, Fig. 4, on which they are carried, thus obtaining an adjustability of parts that allows the same machine to be used for all sizes of bilges or for various bevels, for all sizes of packages from a keg to a hogshead. The cutters $c$ $c$ are driven by carrying the saw-belt $d$ under their shafts K K, as shown in Figs. 2 and 4. The levers E E have stay-rods $e$ $e$, Figs. 2 and 4, which brace them against the strain of the belt, yet allow them to move freely in a vertical direction. It will be seen that as one of the levers yields to the belt $d$, the other lever advances, so as to take up the slack of the belt, and vice versa. The lever G can be set with the movement of the table, so that the taper of the stave will all of it be on one end for butter packages, churns, &c.

This machine has been tried practically and works well. By these means I obtain a very simple and efficient machine, that joints and forms the staves as they are being cut from the bolt.

Having thus described my invention, what I claim as new, and desire to secure by Letters Patent, is—

The combination of the forming-cutters $c\ c$, levers E E, spring-standards $f$, stay-rods $e\ e$, swinging links $g\ g$, and slotted lever G with table A, provided with the connecting-arm H, all the parts being constructed and operating substantially as shown and described, for the purpose specified.

The above specification of my invention signed by me this 3d day of October, 1871.

CHARLES MOWRY.

Witnesses:
STANLEY BAGG.
F. W. EVERS.